United States Patent [19]

Steen et al.

[11] Patent Number: 5,247,155
[45] Date of Patent: Sep. 21, 1993

[54] APPARATUS AND METHOD FOR MONITORING LASER MATERIAL PROCESSING

[75] Inventors: William M. Steen, Caldy; Lin Li, Liverpool; David J. Brookfield, South Wirral; Qi Ning, Liverpool, all of England

[73] Assignee: CMB Foodcan Public Limited Company, Worcester, England

[21] Appl. No.: 741,137

[22] Filed: Aug. 7, 1991

[30] Foreign Application Priority Data

Aug. 9, 1990 [GB] United Kingdom ............... 9017519
Nov. 5, 1990 [GB] United Kingdom ............... 9024000

[51] Int. Cl.$^5$ ............... B23K 26/00; B23K 26/02; B23K 26/14
[52] U.S. Cl. ............................. 219/121.83
[58] Field of Search ............... 219/121.83, 130.21, 219/121.63, 121.64, 121.65, 121.66

[56] References Cited

U.S. PATENT DOCUMENTS

| | | | |
|---|---|---|---|
| 3,581,052 | 5/1971 | Milton | 219/130.21 |
| 4,906,812 | 3/1990 | Nied et al. | 219/121.83 |
| 4,975,558 | 12/1990 | Lukens et al. | 219/130.21 |
| 5,013,886 | 5/1991 | Koegl et al. | 219/121.83 |

FOREIGN PATENT DOCUMENTS 2630795.9 7/1976 Fed. Rep. of Germany.
8711031.8 1/1988 Fed. Rep. of Germany.

OTHER PUBLICATIONS

Kuznetsov et al., *Sov. J. Quantum Electron*, 20(6):667-672, Jun., 1990.
*Patent Abstracts of Japan*, vol. 4, No. 167, Nov. 19, 1980.
Russo et al., *Welding Research Supplement*, 68(6):230S-235S, Jun., 1989.

Primary Examiner—Geoffrey S. Evans
Attorney, Agent, or Firm—Marshall, O'Toole, Gerstein, Murray & Borun

[57] ABSTRACT

Apparatus and method for monitoring laser materials processing, such as laser welding and laser drilling, wherein an indication of the quality of the processing is obtained by monitoring the plasma generated spaced charge distribution near the melt pool. A metal electrode, or electrodes, is disposed near the melt pool but not in contact with the workpiece, nor necessarily in contact with the hot plasma. The electric charge distribution (one dimensional or multi-dimensional) is monitored between the electrode or electrodes and the workpiece or between the electrodes themselves. The existing laser processing nozzle (insulated from the workpiece) can be used for this purpose, multi-probes such as a quadrant nozzle, can identify the focused laser beam position in real time.

17 Claims, 5 Drawing Sheets

APPARATUS AND METHOD FOR MONITORING LASER MATERIAL PROCESSING

FIELD OF THE INVENTION

The present invention relates to an apparatus and method for monitoring laser material processing.

BACKGROUND OF THE INVENTION AND PRIOR ART

The advantages of laser welding over the conventional welding processes in terms of flexibility, speed and weld quality are now well recognised. Indeed many applications of lasers to welding in industry have already been accepted. As more welding systems are being installed by industry, the demand increases for the development of in-process techniques to monitor and control the process quality. This is necessary since weld quality is often affected by the instability of plasma formation during laser welding and instabilities of laser power density.

A multitude of techniques have already been investigated for detecting the weld quality during processing. These include the use of an acoustic mirror which detects the high frequency component of back reflected laser beam from the beam/material interaction zone; an acoustic probe which detects the shock wave generated by the plasma and vapour; an acoustic workpiece which detects the workpiece internal stress waves generated during laser welding; a photo-electric sensor for detecting plasma intensity, a probe laser for detecting melt ripple and plasma diagnosis; a pyrometer for detecting the temperature near the melt pool, and a video camera for monitoring the interaction zone shape.

The known systems and their disadvantages and shortcomings are summarized in the following Table 1.

niques are inadequate either because of the direction or position dependence of the sensor or the bulky body of the associated sensing system. Pulse-weld monitoring techniques such as those based on ultrasonics and eddy currents also suffer from slow response or poor flexibility for high speed multi-dimensional laser welding. For high speed laser welding, some of the methods, such as video image analysis, may not be fast enough for on-line feedback control.

It is an object of the present invention to provide a means of monitoring the quality of laser material processing made using laser apparatus and involving processes such as laser welding, drilling, cutting and surface treatment. A secondary object is to be able to monitor the position of the laser beam itself.

It is known that, during some types of laser materials processing, when laser beam intensity is high enough, an ionized plasma plume is generated in or near the laser-generated melt pool. It is also already known from an article in the Welding Journal, vol.68, No.6, 1989 pages 230S–235S entitled "An Electrostatic Probe for Laser Beam Welding Diagnostics", that the electron density of the plasma in the region above a laser weld can be established using an electrostatic probe consisting of two metallic electrodes in contact with the ionized gas in said region. The workpiece itself serves as one of the electrodes. The other electrode comprises a thin strip or plate of molybdenum with a small hole in it just large enough to pass the laser beam to the workpiece. All surfaces of the molybdenum strip, except that of the interior of the hole, are covered by an electrically insulating film. The insulated molybdenum strip is disposed so as to lie flat on the workpiece, i.e. in contact with it, and is aligned with the laser so that the laser beam passes through the hole to the workpiece. The electrodes are connected to a DC power supply via a resistor so that the current through the ionized gas can

TABLE 1

Previous in-process laser welding monitoring techniques

| METHODS | | PRINCIPLE | COMMENTS |
|---|---|---|---|
| Acoustic | mirror | mirror thermal expansion caused by laser backreflection | fast, coaxial, poor S/N ratio |
| | probe | melt pool vapour or plasma shock wave + laser reflection | good but off-axial temperature dependent |
| | workpiece | stress wave caused by material structure changes | informative contact and position dependent |
| Photo-electric | up | light emission from plasma, vapor, melt pool | fast, cheap but not coaxial and noisy |
| | below | light emission from bottom side of melt pool | not very informative and difficult to place |
| Laser probe | refl. | probe laser beam reflection from the melt pool | fast but off-axial |
| | trans. | probe laser angle change through plasma | good but off-axial and expensive |
| Pyrometer | | Temperature near melt pool | good but direction dependent |
| Vision system | | Image of plasma or weld | informative but slow and expensive |
| pyro-electric | up | laser beam back reflection using a beam spitter | coaxial, but sensor easy to be damaged |
| sensor | below | laser beam through the open key hole | works only when there is an opening |

In all of these known methods, a commercial sensor has to be used and the repeatability of these sensing techniques depends on the sensor quality, position of the sensor (such as a photo-diode), thermal stability of the sensor and contacting stability of the sensor (such as acoustic sensors). For multi-dimensional laser welding with a robot arm, for example, most of the above techbe monitored by measuring the voltage across the resistor. The device disclosed in the article must be in contact with and surround the plasma to form an enclosure to enable the collection of all of the electrons and ions by the application of the voltage applied by the DC power supply between the strip or plate and the workpiece. Its purpose is simply to measure the average and overall electron density and thereby give information about the plasma plume. Since the device must of necessity be in engagement with the workpiece, it is not suitable for monitoring the processing of moving objects on line and in real time. Furthermore, the device described in the article was reported to be incapable of being used for more than one measurement as it is destroyed rapidly by the heat from the workpiece.

The present inventors have noted that, at the high temperatures prevailing during laser processing, the plasma plume expands and a polarized charge is developed in the space between the workpiece and the space around it, and they have now established that the degree of separation of the charge which occurs is related to the prevailing laser processing quality and that a signal can be generated by monitoring this charge separation which can provide useful real time information as to the quality of an on-line process being undertaken.

SUMMARY OF THE INVENTION

Thus, in accordance with the present invention in its broadest aspect, a signal indicative of the quality of laser processing is generated by monitoring the natural separation of the plasma charge, or plasma generated space charge, in the space near a laser generated melt pool.

In accordance with one aspect of the invention, there is provided a method for monitoring laser material processing of a workpiece, wherein a signal representative of processing quality is generated by monitoring the electric charge distribution in the region of a laser-generated workpiece melt pool.

In accordance with a second aspect of the invention, there is provided an apparatus for laser material processing of a workpiece, comprising a means for generating a signal representative of processing quality by monitoring the electric charge distribution in the region of a laser-generated workpiece melt pool.

Monitoring is achieved in a non-contact manner by using a probe electrode disposed above, or in some cases even below, the melt pool, but which does not contact the workpiece or the melt pool and does not have to be in contact with the plasma.

The application of additional DC voltage to the probe electrode is not necessary, although it can be used to detect the conductivity of the space, which in some cases can also provide useful information as to laser processing quality.

In one embodiment, the probe electrode can be formed by the existing laser processing nozzle which is disposed coaxially around the laser beam for directing gas towards the workpiece. In this case, the nozzle needs to be electrically insulated relative to the workpiece. This can be achieved by insulating the nozzle relative to the rest of the laser (which would normally be at earth potential) or by insulating some other part or parts of the laser from earth. The probe will normally include a second electrode which is connected to the workpiece support, or to the workpiece itself. In the case that the second electrode is connected to the workpiece support, the workpiece should be in electrical connection with the support.

The potential difference measured between the two probe electrodes can be related to the one dimensional charge distribution in the space around the melt-pool. Such an arrangement allows the traverse of the workpiece relative to the laser beam during a monitoring operation.

Since a coaxial nozzle is used in almost all cases in current laser materials processing, the aforegoing embodiments utilising the nozzle to form or carry the probe provides a very convenient way of obtaining laser processing quality information in an omni-directional and non-intruding manner, without having to use an additional sensor in the region of the plasma which would have problems of robustness and sensitivity in the harsh environment encountered in practice in this region. These robust, coaxial and non-contact features of the invention are especially useful when a laser robot is used.

In other embodiments, an additional nozzle or sleeve can be used radially outwardly of the existing one, with electrical insulation between the two. The second nozzle or sleeve works as an electrical shield and signal booster when a DC voltage is applied to it, while the signal collecting internal nozzle which has no additional voltage application measures the potential difference between the nozzle and workpiece.

In a still further embodiment, a quadrant nozzle can be used in addition to the existing laser processing nozzle for multi-dimensional charge distribution monitoring. The signal differences between each segment of the quadrant nozzle can be used for the determination of focused laser beam position relative to the central axis of the processing nozzle. Alternatively, in a still further embodiment, conducting segments on an otherwise insulated nozzle can be used to detect the charge distribution in the space.

A further embodiment can utilize a multiplicity of probes located in or around the void of the melt pool. Relative electrical signals between these probes are measured. The workpiece may or may not take part in the detection loop.

The nozzle electrodes mentioned hereinbefore can be a substantial distance from the melt pool and not necessarily be in contact with the plasma, although the signal will be stronger when the nozzle probe is nearer to the melt pool.

A capacitor or a filtering circuit can be used across the probe outputs for the smoothing of the signal to obtain an average signal level.

BRIEF DESCRIPTION OF THE DRAWINGS

The invention is described further hereinafter, by way of example only, with reference to the accompanying drawings, in which.

DETAILED DESCRIPTION OF THE PREFERRED EMBODIMENT

Figure 1:
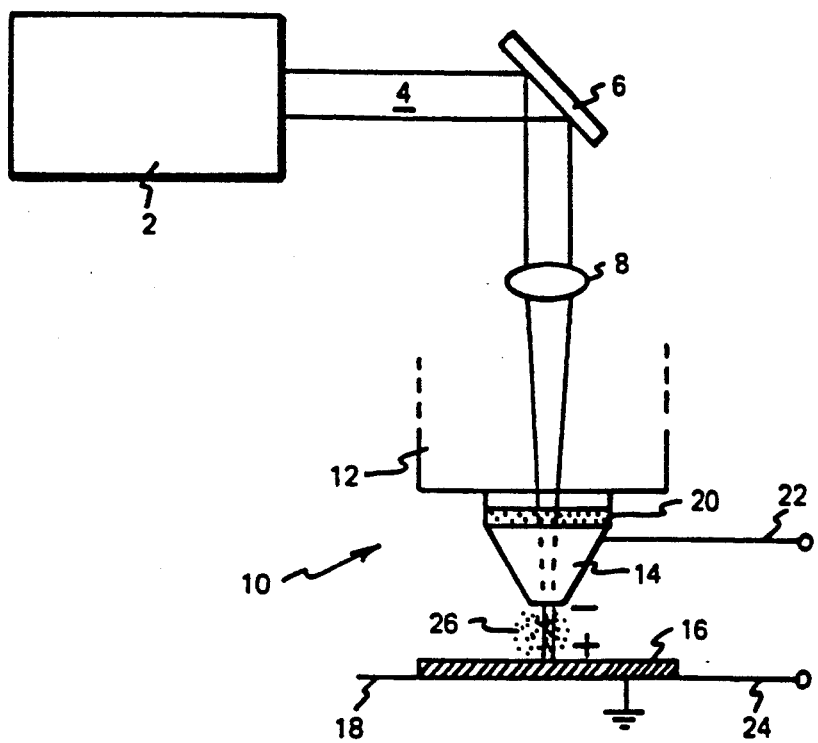
FIG. 1 is a diagrammatic representation of a one dimensional charge distribution monitoring arrangement in one embodiment of a laser processing apparatus in accordance with the present invention.

FIG. 1 shows very diagrammatically an example of a laser processing apparatus 10 comprising a laser generator 2 providing a laser beam 4 which is directed at a workpiece 16 to be processed by means of an angled mirror 6, a lens 8 or other focusing means, and a nozzle assembly 12. The nozzle assembly 12 includes a frusto conical nozzle 14 for directing a gas, such as argon, towards the workpiece 16 which is disposed on an electrically conductive support 18. In this embodiment, the nozzle 14 is used as a test electrode and is therefore made of metal or has a metallized outer coating. For example, the nozzle could be solid metal or be a non-metallic material, e.g. a ceramic, coated with metal over at least part of its surface. The metallic nozzle 14, or the metallic part of the nozzle, is both mechanically and electrically isolated from the workpiece 16. In the case that the workpiece is earth-linked to the support 18 and thence to the nozzle assembly 12, this can be achieved by electrically isolating the metallic nozzle, or the metallic part of the nozzle, from the nozzle assembly 12 (and the other parts of the laser) by an insulating member, such as an insulating ring 20. In such cases, the workpiece is in electrical connection with the support 18, which may typically be in the form of an x-y table for traversing the workpiece under the laser beam. The potential difference between the metallic nozzle 14 and the workpiece 16 can be measured via metallic leads 22,24 connected respectively to the nozzle 14 and to a stationary part of the support 18. If both the workpiece support 18 and the probe signal processing instrument (not shown) are earthed, lead 24 can be omitted.

During, for example, welding, there is formed in the space between the laser nozzle 14 (which is at some distance from the workpiece) and the workpiece 16 an ionized plasma 26. As explained in further detail hereinafter, it is found that this plasma generates a polarized space charge, with the region furthest from the workpiece acquiring a net negative charge relative to the region nearer to the workpiece, or vice versa in some cases. As a result, a potential difference is established between the nozzle 14 and the workpiece 16 which has been found to vary in a consistent manner with the nature and quality of the process being undertaken.

FIGS. 2a-2f illustrate a number of possible ways in which this variable charge (potential difference) between the nozzle and the workpiece can be detected and converted into a monitorable electrical signal.

Figure 2A:
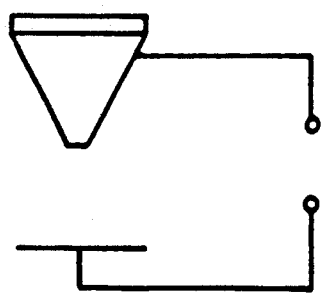
FIGS. 2(a), 2(b), 2c), 2(d), 2(e) and 2(f) show a number of different circuit arrangements by which a useful signal can be extracted from the apparatus of FIG. 1.

FIG. 2a shows a basic arrangement corresponding to FIG. 1.

Figure 2B:
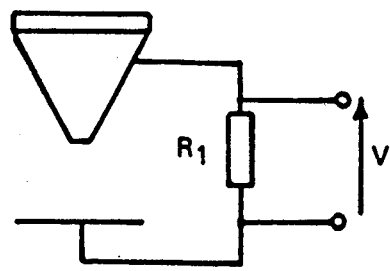

FIG. 2b shows that changes in potential differences between the nozzle and workpiece can be monitored by detecting a voltage V representative of the changing electric current in a resistor R1.

Figure 2C:
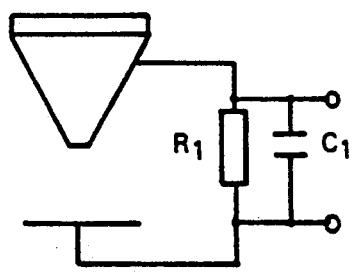

FIG. 2c shown that the average potent difference between the nozzle and workpiece can be monitored by detecting the time integral of the changing current in the resistor R1 using a capacitor C1.

Figure 2D:
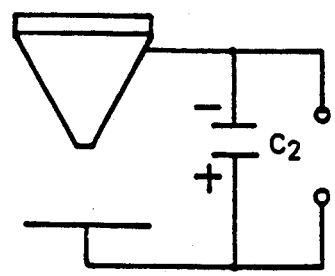
Figure 2E:
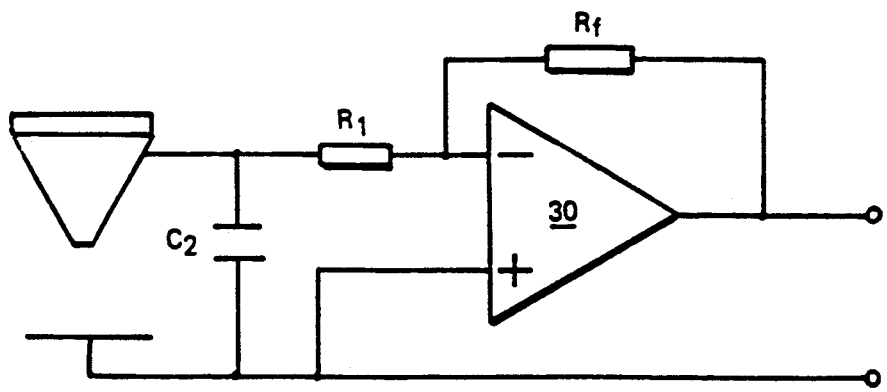

FIG. 2d shows that the changes in potential difference can be monitored by detecting the changes in potential across a capacitor C2 whereas FIG. 2e shows how the potential difference across capacitor C2 can be measured using an operational amplifier 30.

Figure 2F:
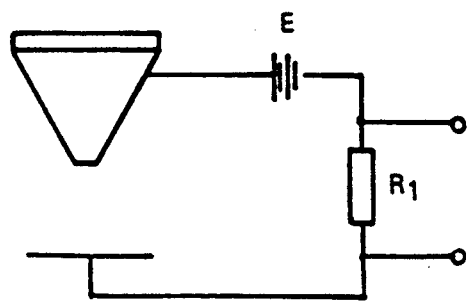

In the arrangement of FIG. 2f, a DC supply E is placed in series with the monitoring loop. This can be used to enhance the signal collection.

Figure 4:
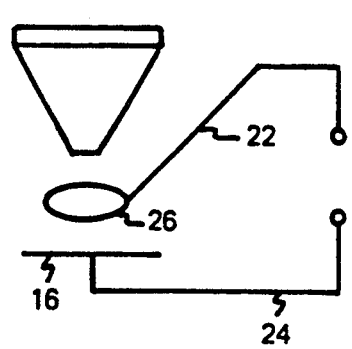
FIGS. 4 and 5 illustrate further embodiments of charge collecting means.

FIG. 4 illustrates an alternative sensor arrangement in which, rather than using the nozzle itself as a detector electrode, a separate probe electrode, e.g. in the form of loop 26, is used. In this case, the other lead 24 can be connected to the workpiece support and/or the workpiece as in the case of FIG. 1.

Figure 5:
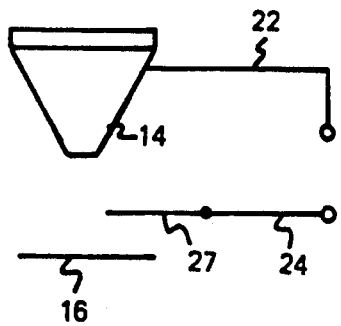

In the arrangement of FIG. 5 on the other hand, one connection lead 22 is connected to a metallic or metallic coated nozzle 14 and the other lead 24 is connected to a probe 27 which is disposed adjacent to, but spaced from, the workpiece. The lead to the workpiece support in this case can be omitted. As before, the potential difference between these two probes 14, 27 can be used to identify laser processing quality. The workpiece in this case is not part of the sensory unit. This is particularly useful when the workpiece is coated or painted with insulating material or the workpiece support is made of an insulating material.

Figure 6:
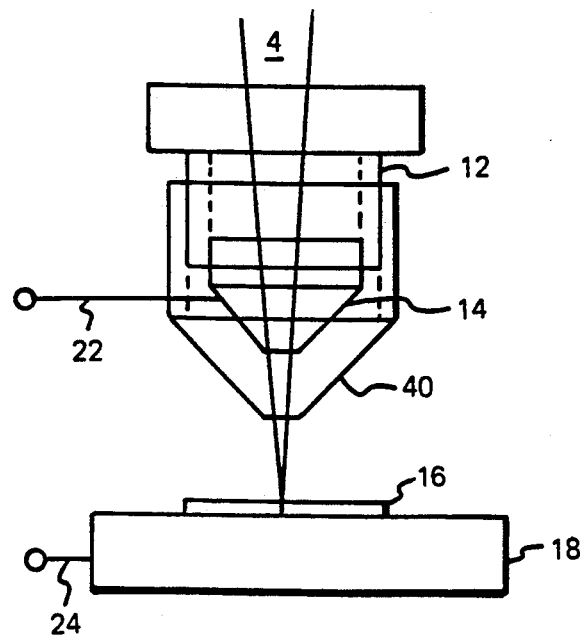
FIG. 6 illustrates diagrammatically the use of dual nozzles for one dimensional enhanced charge distribution monitoring in accordance with the present invention.

In the embodiment of FIG. 6, a DC voltage $V_1$ is applied to an external nozzle 40 (which is formed as an electric shield for the internal nozzle 14) relative to the workpiece 16. The internal nozzle 14 is used for establishing the charge signal as before. The collected signal is found to be amplified by the electric field of the external nozzle 40 when the applied voltage to the nozzle 40 is positive relative to the workpiece.

Figure 7:
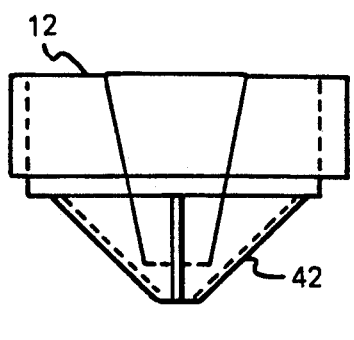
FIGS. 7 and 8 are side and inverted plan views illustrating a quadrant nozzle in accordance with the present invention for the monitoring of focussed laser beam position as well as processing quality in real time.
Figure 8:
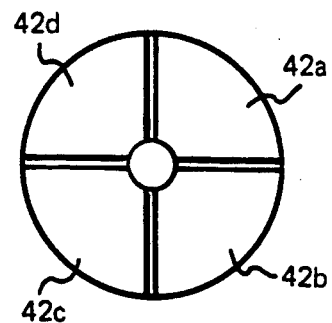

FIGS. 7 and 8 illustrate the use of a quadrant nozzle 42 wherein the nozzle is formed in four segments 42a-42d which are electrically isolated from each other. The potential differences between the various segments of the nozzle have been found to be related to the focused laser beam position. If the beam is shifted to one side, the signal corresponding to that segment is stronger than the others. This can be used not only for on-line diagnosis but also for automatic laser beam alignment at the focused point.

In use, using any one of the above described detector arrangements, the signal extracted from the leads 22, 24 via any of the circuits arrangements of FIGS. 2a-2f can be used to provide useful information as to the nature and quality of the process being undertaken.

In order to explain the causes of the signal so obtained and its relationship to weld quality, it is necessary to consider the physical phenomena involved during laser welding. Since the signal detected by the sensor is the micro-current flow from the workpiece to the nozzle measured by the potential differences in the space, it will depend on the spacial and temporal distribution of the electron/ion density along the beam axis.

During laser welding, the surface material will undergo the sequence of melting, vaporisation and plasma generation if sufficient power (power density $>10^6/cm^2$) is absorbed. Plasma formation originates from the absorption of laser light in a keyhole or melt pool generating very hot vapour which is partially ionized. Electrons inside the gaseous interaction volume are capable of absorbing photons by an inverse Bremsstrahlung process to raise them to higher quantum states which may be sufficient to further ionize the ambient gas or material vapour, thus increasing the number of electrons by avalanche ionization. The density of the plasma is therefore largely decided by laser beam intensity and metal vapour density (a function of weld quality) which is given by;

$$n_m(t) = \text{const.} \left[ AI - \frac{\sqrt{2\pi}\, T_v K/r_f}{\tan^{-1} \frac{\sqrt{8\kappa t}}{r_f}} \right] \quad (1)$$

where $n_m$=vapour density, A=absorptivity, I=laser intensity, $T_v$=the temperature of the vaporization, K=thermal conductivity, $r_f$=focus radius of the beam, k=thermal diffusivity, and t=interaction time. The laser generated plasma consists of electrons and positively charged ions. Since the temperature of the material vapour and plasma volume is high ($10^4$–$10^6$ K), a pressure or shock wave is usually generated because of temperature differences between the volume and surrounding atmosphere, which enables the plasma to expand rapidly. Since a singly ionized atom has the same charge as an electron but of the opposite sign, a potential difference can not be established unless they travel with different speed or direction. Because the mass of the lightest positive ion is over 1000 times that of an electron whilst the mobility is inversely proportional to their mass, the electrons travel faster, causing an uneven space charge with the outer part more negative.

Once a plasma is generated, the laser beam will interact with plasma. The absorption of laser beam by the plasma is through free electron/photon interaction. The absorption coefficient of plasma is given by:

$$K_v = (4/3)(2\pi/3kT)^{\frac{1}{2}}(n_e n_i Z^2 e^6 / hcm^{3/2} v^3)[1 - \exp(-hv/kT)] \quad (2)$$

where;

$K_v$=plasma absorption coefficient to the laser beam
$n_e$=electron density
$n_i$=ion density
Z=average charge of the plasma
T=average temperature of the plasma
v=frequency of the incident beam
c=speed of light
e=electron charge
m=electron mass
h=Plank's constant
k=Boltzmann's constant The above absorption relationship holds only if the laser beam frequency is higher than the plasma frequency $V_p$ which is given by:

$$V_p = 8.9 \times 10^3 n_e^{\frac{1}{2}} \quad (3)$$

otherwise the laser beam would be totally reflected. From the above relationships it can be seen that the absorption coefficient of the plasma to laser beam is proportional to the electron and ion densities. Since the beam penetration depth into the plasma is approximately equal to 1/Kv, a higher electron density, would prevent the laser beam from direct radiation onto the melt pool. Thus the energy would be either blocked (if either plasma is decoupled from the surface or electron density is too high or electron energy is saturated) or partially transferred back to the workpiece by electron conduction, radiation and condensation, in which re-radiation is considered to be dominating the transfer process. In either case the power density, or the focus of the beam will be seriously disturbed. The energy transfer from electrons to the ions is influenced by the recombination rate, which is given by:

$$R_{rec} \approx \text{const.}\, n_e^2 / \sqrt{\epsilon} \quad (4)$$

where $\epsilon$ is the average electron energy in the plasma.

The re-radiated energy by plasma can be expressed as:

$$P = 1.42 \times 10^{-34} Z^3 n_i^2 T^{\frac{1}{2}} W/CM^3 \quad (5)$$

which is proportional to the ion density in the plasma. Since plasma radiation originates from electron re-combination with the ions and thus has a much shorter wavelength than the laser bean (e.g., CO2, 10.6μm, or YAG, 1.06 μm), the energy absorption by the metal workpiece may be increased as the result of the shorter wavelength radiation, which may lead to further vaporization and ionization. As the plasma expands, its density (electrons and ions) changes which in turn alters the beam absorption and energy transfer routes. Therefore the beam absorption and plasma generation varies during processing because of the plasma effects.

The expansion velocity of the plasma or plasma generated pressure waves can affect weld quality significantly. For subsonic speeds the pressure wave is called "Laser Supported Detonation Combustion Wave" (LSCW). The plasma remains coupled to the workpiece in this phase, and enhanced absorption occurs. For supersonic expansion waves called "Laser Supported Detonation Wave" (LSDW), the plasma becomes decoupled from the workpiece surface and the energy absorbed by the plasma is carried away by the fast moving expansion.

There are four basic modes of operation for laser welding affected by the plasma. They can be summarized as follows:

1) Conduction limited welding (power density $<10^6 W/cm^2$): At these low power densities there is no plasma formation. Only non-ionized vapour is formed which does not affect beam absorption. Weld penetration is achieved by thermal conduction. The weld is characterized by a low depth/width fusion zone. The signal obtained by monitoring charge separation is zero in this instance.

2) Plasma enhanced keyhole welding ($10^6$ W/CM$^2$ power density $<10^7$ W/CM$^2$): At this power level there is plasma with LSCW formation above the melt pool and the plasma remains coupled to the weld key hole. The result is a good weld with deep penetration. The monitored signal in this case is high and constant in this instance.

3) Through keyhole welding: ($10^6$W/cm$^2$ power density $>2 \times 10^7$W/cm$^2$): Although the power density range is similar to that of mode 2, a through keyhole (keyhole which is open at the bottom side of the workpiece) can be generated if the power input is high for the speed and material thickness used. When there is a such keyhole generation, some of the plasma is blown through the opening by both shroud gas and recoil pressures. If the pressures are not so high some of the positive ions may still be above the work surface giving a reversed space charge. If however the pressures are sufficiently high, then all plasma may be blown away. The monitored signal in this case is either positive or zero.

4) Plasma disturbed laser welding (power density $>2>10^7$ W/cm$^2$): At this high intensity, the supersonic LSDW is generated. The plasma usually has high electron density and is decoupled from the surface. Thus the laser beam is periodically blocked. Humping, undercut or crater generation in the weld often results. The monitored signal in this instance exhibits violent fluctuations.

The aforegoing analysis demonstrates examples of situations wherein electron/ion density and distribution in the space above the interaction zone is indicative of laser processing quality. Therefore, by monitoring the behaviour of the electron/ion distribution during processing the behaviour of laser/material interaction and process quality can be analysed in real time and, in the illustrative case, the different weld operating modes recognised and monitored.

Figure 3:
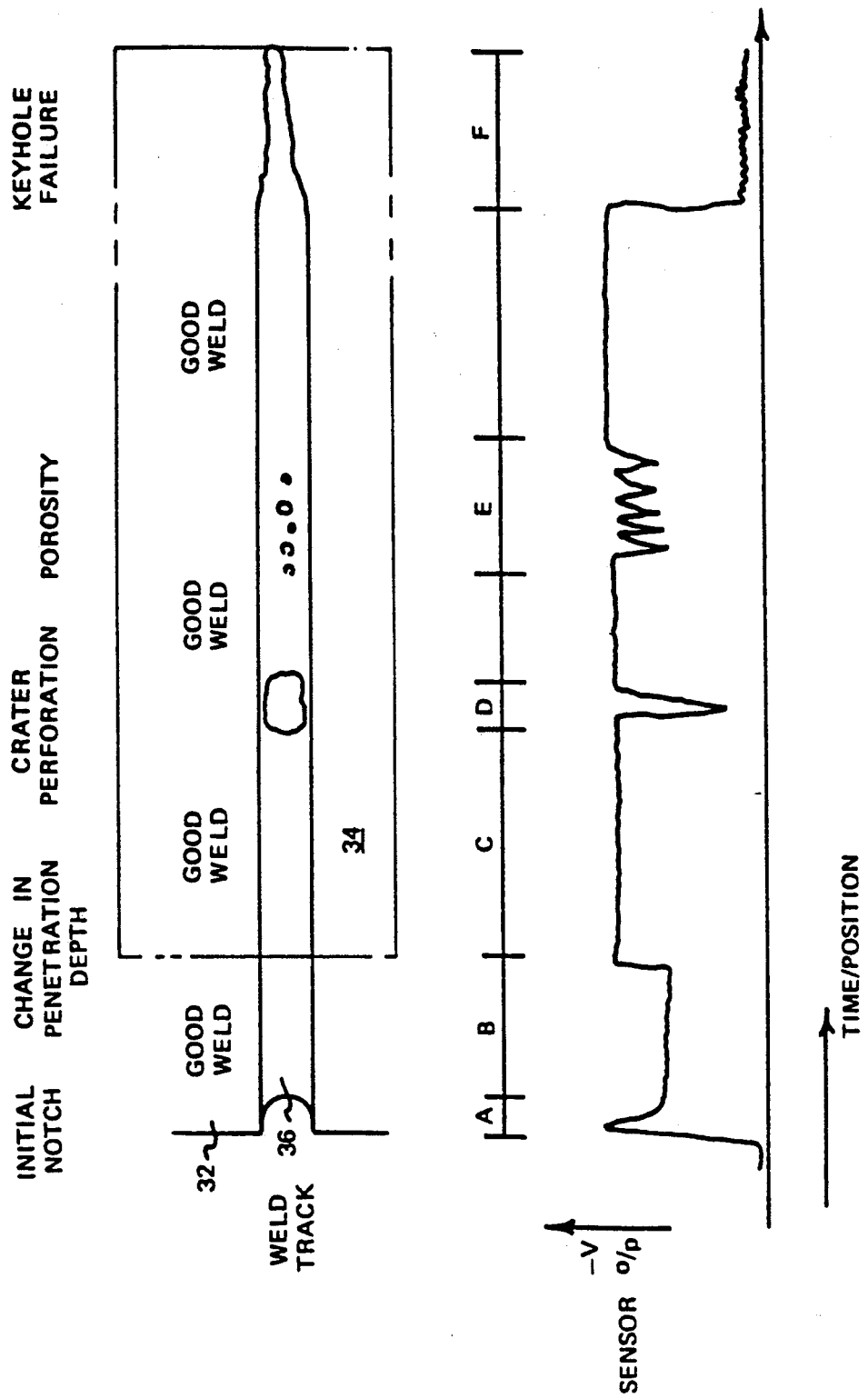
FIG. 3 is a schematic diagram showing, by way of example of the application of the present invention to a typical process, nozzle sensor readouts for different types of weld condition.

Purely by way of example, an application of the use of the present sensor to laser welding is now described with reference to FIG. 3. The upper part of FIG. 3 is a plan view of a laser weld 36 made between two metal plates 32, 34. The lower part of FIG. 3 shows the output signal (idealised) of the detector circuitry, corresponding to one of the circuits shown in FIGS. 2a-2f.

Assuming that the weld is being made from left to right in FIG. 3, where a notch occurs at the left hand edge the detector signal is reversed and exhibits a positive peak (region A). For region B corresponding to a good weld, the detector signal is of medium amplitude and is constant. Where there is a double thickness of metal to be welded (such as region C) the signal is of higher, constant amplitude. Where a crater occurs in the weld (region D), the detector signal shows a sharp drop in amplitude. Where the weld has a pitted area (region E), the detector signal shows a series of oscillating spikes. Should there be a loss of keyhole in the weld, the detector signal drops nearly instantaneously to close to zero (region F). These output signals are by no means exhaustive of all of the weld characteristics that can be identified and are cited merely by way of example of types of signals obtained in one type of laser process to which this invention is applicable.

Whereas the single profiles shown in FIG. 3 are idealised, the actual output is somewhat noisier and requires some simple signal processing and filtering in order to achieve a clean profile. However, such techniques are well known and need not be described in detail herein.

Experimental studies using the above described apparatus have been performed and have revealed as follows:

a) Lap (Seam) Welding Quality Monitoring

The response of the sensor to weld quality variation demonstrates that the sensor can tell not only the differences between good and bad welds, but can also distinguish different weld faults such as end notches, holes, vapour craters, pitting, mis-tracking (differences between single plate and double plate) and the loss of keyhole.

In addition, the sensor is able to detect the variation of penetration depth without contacting the workpiece, which previous sensors fail to do.

Thus the present method of monitoring laser material processing, comprising monitoring the electric charge distribution in the region near the melt pool, can be applied to the monitoring of a large number of processes, including keyhole monitoring in laser welding, monitoring porosity formation in laser welding, monitoring weld penetration, monitoring weld alignment, monitoring piercing in laser cutting, monitoring the size of drilled holes, monitoring laser beam pointing stability, monitoring laser weld gas injection stability, and monitoring plasma stability during laser processing.

b) Butt Welding Quality Monitoring

The sensor is able to distinguish mis-tracking, open butt, step butt, notches, burned holes and loss of keyhole.

Spot Welding

It has been found using the present sensor that different weld quality corresponds to different signal patterns. By comparing the actual signal pattern to a reference pattern, automatic evaluation of the weld quality can be made.

d) Laser Drilling Quality Monitoring

Experiments show that the sensor can determine the size of a hole drilled by the laser. The duration of the charge signal is found to be proportional to the diameter of the drilled hole. One is often unaware when drilling is completed. An apparatus in accordance with the present invention can indicate this information quite easily and thus offer possibilities of increased efficiency in processes such as piercing during a start of laser cutting away from the edge of a workpiece. Other parameters, such as heat affected zone (HAZ), dross adhesion and roundness can also be analysed.

Cutting Quality Monitoring

An apparatus in accordance with the present invention can distinguish between through cut and non-through cut pieces. For thin metal plates, the apparatus can differentiate between cut samples with different cut kerf widths, amount of dross and cut edge roughness. A good cut always produces minimum or near zero sensor signal responses while a bad or non-through cut produces higher or irregular signal responses.

f) On-line Laser Beam Pointing Stability Sensing

Experiments demonstrate that when the position of the beam within the probe/nozzle changes, the amplitude of the apparatus response also changes. This enable the use of four probes (or a split nozzle on the outside of the existing nozzle (see FIGS. 7 and 8), (or conducting segments on an otherwise insulated nozzle) to determine the alignment of the laser beam with respect to the center of the nozzle, or to monitor the pointing stability of the laser beam. A multi-pole probe can be used image the distribution or the shape of the charged plasma.

Other processes such as, by way of example only, laser surface alloying, can be also monitored provided that there is production of plasma by the process.

In regard to the operating characteristics of the sensor, experimental study has revealed the following:

i) Effect of Laser Power

Increasing the laser power increases the sensor response which is in agreement with the penetration monitoring experiments. This is perhaps because more material is ionised which produces greater space charge separation when the laser power is increased.

ii) Effect of Nozzle Gas

An increase in the amount of nozzle gas (argon gas was used in the experiments) increases the sensor response at low flow rate regions. This may be due to the argon gas assisting in the ionisation of vapour material and possibly due to the environmental gas breaking down and generating more charge particles. The level of noise on the monitored signal decreases when the volume flow rate of nozzle gas is increased in this flow region. Further increase of gas flow reduces the signal because of the cooling or blowing away of plasma. When different types of nozzle shroud gases are used, the sensor response magnitude also varies with lower ionization potential. Gases such as Argon generate stronger responses while the higher ionization potential gases such as Helium generate weaker signals.

iii) Effect of Direction of Motion

By way of example only, in welding applications, the trailing side appears to exhibit a stronger signal when two probes are positioned facing each other on the side of the nozzle parallel to the moving direction. An asymmetric distribution of the ionized material relative to the center of the nozzle perhaps occurs as the material requires some time to reach the ionization state when heated by the laser beam. The direction of motion has no effect on the probes positioned in a direction perpendicular to it. When a ring collector or the nozzle itself is used, the direction of motion has no effect.

iv) Effect of the Position of the Probe

The nearer the probe to the center of the melt pool the stronger the sensor response. The second probe which is positioned between the nozzle and the first probe has, however, no significant effect on the sensor response when position changes.

v) Effect of Additional Voltage

Different level DC voltages (from −30 to +30V) were applied to the nozzle to investigate whether or not the sensor sensitivity could be increased. Experiments have indicated that if the space between the workpiece and the nozzle is not made conductive by the charges, the signal collected has no significant variation from the zero power supply application case. If, however, the space is conductive (when the probes are near to the workpiece) then the sensor response magnitude is linearly proportional to the applied voltage. AC voltage application has no significant effect, except at the plasma resonance frequency. When the DC voltage is applied to the second nozzle 40 (between the first nozzle and the workpiece) as illustrated in FIG. 6 and the internal nozzle 14 is used as the collecting probe, the sensor response increases with one polarity and is not much affected with the opposite polarity.

Figure 9:
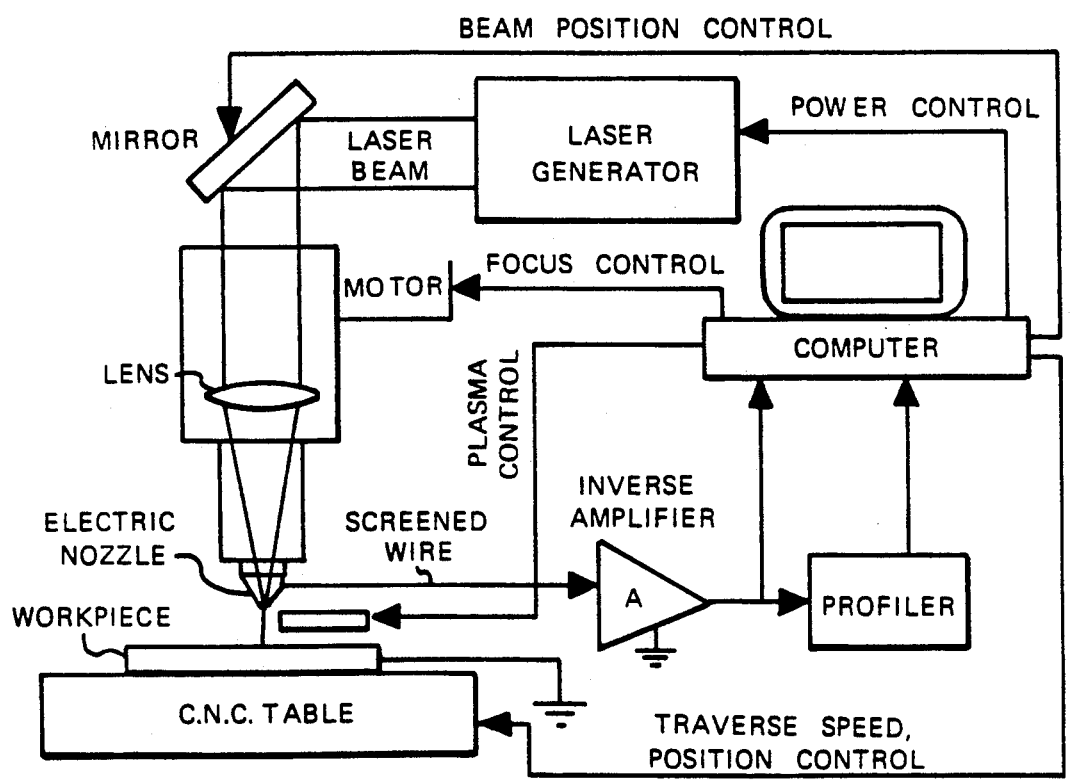
FIG. 9 illustrates schematically one embodiment of an on-line laser weld quality control system embodying the present invention.

Referring finally to FIG. 9, there is shown one example of how the present invention may be incorporated into a system to provide automatic on-line laser weld quality control.

The control system of FIG. 9 comprises four closed loops: depth of penetration control through laser power or table speed variation; beam absorption control through plasma density variation; seam tracking through mirror angle or worktable position variation; and focus control through lens to work distance variation.

From experimental tests, certain rules can be summarized for on-line weld fault diagnosis, the fault signals being derived by comparing the detected signals with the signal recorded for a normal weld. The system can be arranged to automatically react such that:

a) If the detected signal average DC level is below the lower limit of the normal but higher than zero then it is likely that laser power density is too low or for lap welding there is mistracking (if laser power has not changed). Decision: increase the laser power or reduce the speed (if power has reached to its highest level) or adjust the beam position.

b) If the signal drops to zero then this indicates either loss of key hole or a through hole. Decision: apply plasma control through, for example, blown gas or adjust the focus.

c) If the signal is too high then this indicates too high power or mistracking (for butt welding). Decision: reduce laser power or increase speed, adjust beam position.

d) If the signal oscillates then indicates pitting or fluctuating plasma. Decision: plasma control or focus control.

Comparisons made between the invention described herein and previous techniques have revealed that in most cases; the charge collecting sensor is more economical; more reliable and more flexible than previous techniques such as photodiodes, video sensors, acoustic sensors or plasma mass spectrometers.

We claim:

1. Apparatus for laser material processing of a workpiece, comprising:
   (a) laser means for generating a laser beam;
   (b) workpiece support means for supporting a workpiece in the path of said laser beam so that a laser generated melt pool is established in the workpiece;
   (c) signal generating means for generating a signal representative of processing quality by monitoring the electric charge distribution in the region of said laser-generated workpiece melt pool;
   (d) said signal generating means comprising a probe device and means for supporting the probe device at a position between said laser means and said workpiece support means, such that the probe device is held at a distance from the workpiece;
   (e) said probe device comprising at least one metal electrode disposed so as to lie near to, but not in contact with, the workpiece melt pool generated, in use, by said laser beam; and
   (f) said laser means including a gas nozzle disposed at an output end of said laser means, coaxially with the laser beam, for directing gas towards the workpiece, and said at least one metal electrode of said probe device being formed by said gas nozzle.

2. Apparatus according to claim 1, including means for electrically isolating said metal electrode from said laser means.

3. Apparatus according to claim 2, wherein said means for electrically isolating said metal electrode from the laser means comprises an insulating member disposed between said nozzle and said laser means.

4. Apparatus according to claim 1, wherein said signal generating means comprises a probe device and means for supporting the probe device in the region of said laser-generated workpiece melt pool but at a distance from the workpiece.

5. Apparatus according to claim 4, wherein the probe device comprises at least one metal electrode disposed so as to lie near to, but not in contact with, the workpiece melt pool generated, in use, by said laser beam.

6. Apparatus according to claim 1, wherein the probe device comprises at least one pair of electrodes disposed between said laser means and said workpiece support and spaced apart in a direction parallel to the laser beam axis, and wherein said signal generating means includes monitoring means having detection circuitry for detecting the charge distribution in the space between said pair of electrodes, without said workpiece being involved as part of said detection circuitry.

7. Apparatus according to claim 1, wherein the probe device comprises a plurality of metallic components which are disposed equidistantly around the laser beam axis and at a uniform distance from said workpiece support, there being provided a means for monitoring the potential difference between said plurality of metallic components.

8. Apparatus according to claim 1, further comprising a computer-controlled feedback system adapted to control at least one operating characteristic of the laser in response to said signal, such as to automatically correct processing faults detected in the processing quality.

9. Apparatus for laser material processing of a workpiece, comprising:
   (a) laser means for generating a laser beam;
   (b) workpiece support means for supporting a workpiece in the path of said laser beam so that a laser generated melt pool is established in the workpiece;
   (c) signal generating means for generating a signal representative of processing quality by monitoring the electric charge distribution in the region of said laser-generated workpiece melt pool;
   (d) said signal generating means comprising a probe device and means for supporting the probe device at a position between said laser means and said workpiece support means, such that the probe device is held at a distance from the workpiece;
   (e) said probe device comprising at least one metal electrode disposed so as to lie near to, but not in contact with, the workpiece melt pool generated, in use, by said laser beam; and
   (f) said laser means including a gas nozzle disposed at an output end of said laser means, coaxially with the laser beam, for directing gas towards the workpiece, and said at least one metal electrode of said probe device being carried by said gas nozzle.

10. Apparatus according to claim 9, including means for electrically isolating said metal electrode from said laser means.

11. Apparatus according to claim 10, wherein said means for electrically isolating said metal electrode from the laser means comprises an insulating member disposed between said nozzle and said laser means.

12. Apparatus according to claim 9, wherein the first mentioned nozzle carrying said metal electrode of the probe device is itself embraced and partially enclosed in a non-contacting manner by an electrically conductive second nozzle, to which an electrical potential is applied from a voltage source.

13. Apparatus for laser material processing of a workpiece, comprising:
   (a) laser means for generating a laser beam;
   (b) workpiece support means for supporting a workpiece in the path of said laser beam so that a laser generated melt pool is established in the workpiece;
   (c) signal generating means for generating a signal representative of processing quality by monitoring the electric charge distribution in the region of said laser-generated workpiece melt pool;
   (d) said signal generating means comprising a probe device and means for supporting the probe device at a position between said laser means and said workpiece support means, such that the probe device is held at a distance from the workpiece;
   (e) said probe device comprising at least one metal electrode disposed so as to lie near to, but not in contact with the workpiece melt pool generated, in use, by said laser beam;
   (f) said laser means including a gas nozzle disposed at an output end of said laser means, coaxially with the laser beam, for directing gas towards the workpiece, and said at least one metal electrode of said probe device being formed by said gas nozzle; and
   (g) wherein the first mentioned nozzle forming said metal electrode of the probe device is itself embraced and partially enclosed in a non-contacting manner by an electrically conductive second nozzle, to which an electrical potential is applied from a voltage source.

14. Apparatus for laser material processing of a workpiece, comprising:
   (a) laser means for generating a laser beam;
   (b) workpiece support means for supporting a workpiece in the path of said laser beam so that a laser generating melt pool is established in the workpiece;
   (c) signal generating means for generating a signal representative of processing quality by monitoring the electric charge distribution in the region of said laser-generated workpiece melt pool;
   (d) said signal generating means comprising a probe device and means for supporting the probe device at a position between said laser means and said workpiece support means, such that the probe device is held at a distance from the workpiece;
   (e) said probe device comprising at least one metal electrode disposed so as to lie near to, but not in contact with, the workpiece melt pool generated, in use, by said laser beam; an d
   (f) said laser means including a gas-nozzle disposed at an output end of said laser means, coaxially with the laser beam, for directing gas towards the workpiece, said probe means being formed by a nozzle device located at the output end of the laser means for directing a gas towards said workpiece support, including means for electrically isolating said nozzle device from said workpiece support.

15. Apparatus for laser material processing of a workpiece, comprising:
   (a) laser means for generating a laser beam;
   (b) workpiece support means for supporting a workpiece in the path of said laser beam so that a laser generated melt pool is established in the workpiece;
   (c) signal generating means for generating a signal representative of processing quality by monitoring the electric charge distribution in the region of said laser-generated workpiece melt pool;
   (d) said signal generating means comprising a probe device and means for supporting the probe device at a position between said laser means and said workpiece support means, such that the probe device is held at a distance from the workpiece;
   (e) said probe device comprising at least one metal electrode disposed so as to lie near to, but not in contact with, the workpiece melt pool generated, in use, by said laser beam; and
   (f) said laser means including a gas-nozzle disposed at an output end of said laser means, coaxially with the laser beam, for directing gas towards the workpiece, and said probe means comprising a plurality of metallic components which are disposed equidistantly around the laser beam axis and at a uniform distance from said workpiece support, there being provided a means for monitoring the potential difference between said plurality of metallic components.

16. A method of monitoring laser material processing quality in laser processing of a workpiece wherein a material is melted by a laser beam generated by a laser beam-producing device to produce a laser-generated melt pool and an ionized gas in a region adjacent to the melt pool and including an electrostatic probe in contact with the ionized gas in the region of the melt pool for monitoring electric current passing through the ionized gas proximate to the melt pool, the improvement comprising monitoring the electric charge distribution in an area in close proximity to the melt pool by inserting said probe at a position between said laser beam-producing device and said workpiece, while maintaining said probe at a distance from said workpiece, said probe including a metal electrode comprising a gas nozzle output portion of said laser beam-producing device, disposed coaxially with the laser beam and so as to lie near to, but not in contact with, the workpiece melt pool generated by said laser beam.

17. The method of claim 16, wherein the material processed is metal being welded.

* * * * *

UNITED STATES PATENT AND TRADEMARK OFFICE
CERTIFICATE OF CORRECTION

PATENT NO.  : 5,247,155

DATED       : SEPTEMBER 21, 1993

INVENTORS   : STEEN, ET AL.

It is certified that error appears in the above-identified patent and that said Letters Patent is hereby corrected as shown below:

Column 5, line 62, after "average" delete "potent" and substitute therefor -- potential --; and Column 8, line 66, delete " $> 2 > 10^7$ W/cm$^2$)" and substitute therefor -- $> 2 \times 10^7$ W/cm$^2$) --.

Signed and Sealed this

Sixteenth Day of August, 1994

Attest:

BRUCE LEHMAN

*Attesting Officer*     *Commissioner of Patents and Trademarks*